Nov. 24, 1970     F. W. NELSON     3,541,705

FLUID TABLE EDUCATIONAL DEVICE

Filed Nov. 12, 1968     4 Sheets-Sheet 1

INVENTOR
FLOYD W. NELSON by: Bair, Freeman + Molinare
ATTYS.

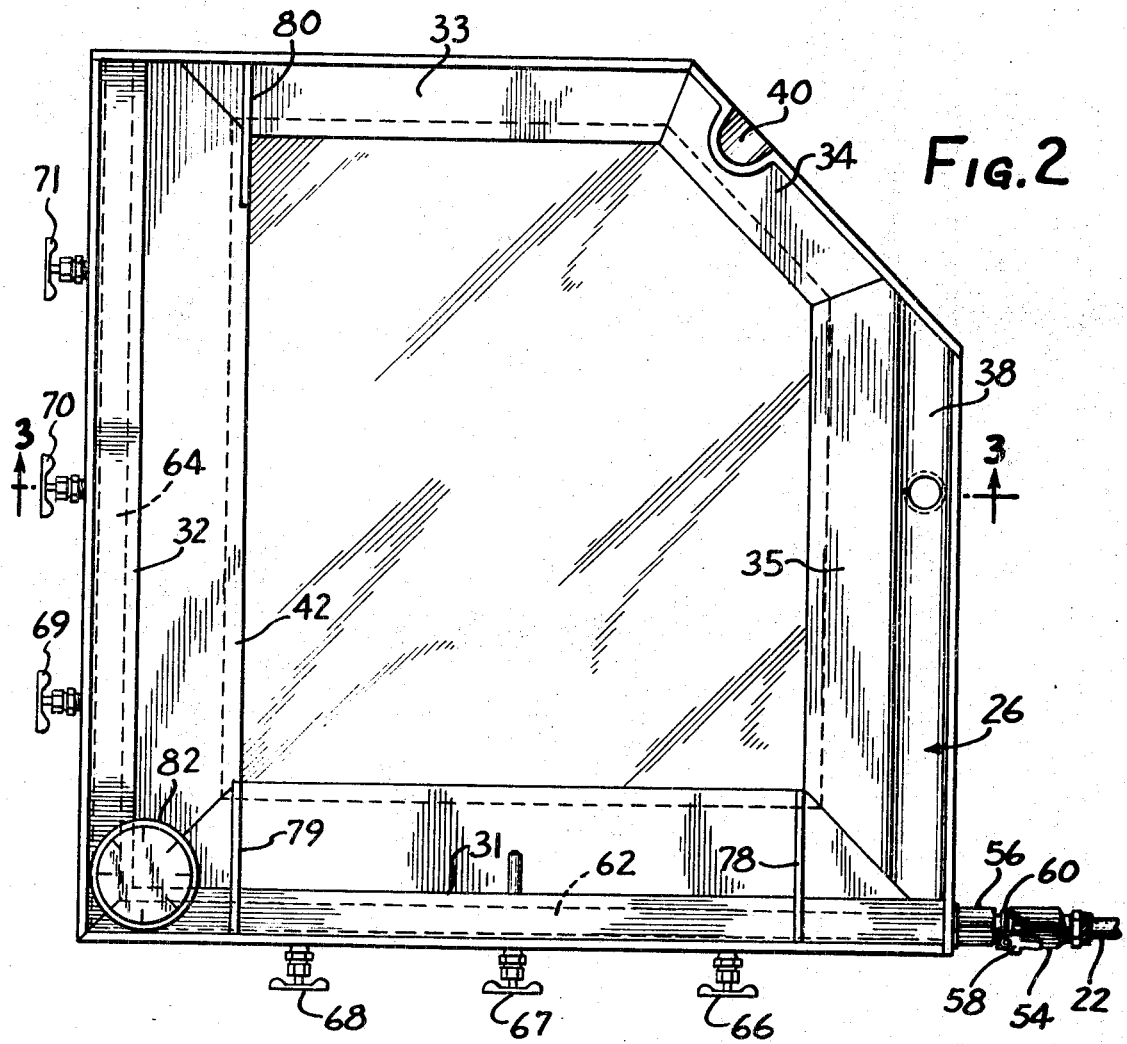
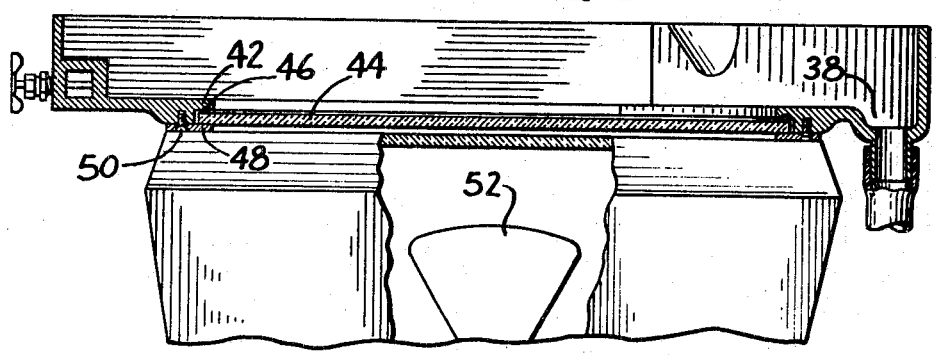

Nov. 24, 1970   F. W. NELSON   3,541,705
FLUID TABLE EDUCATIONAL DEVICE
Filed Nov. 12, 1968   4 Sheets-Sheet 3
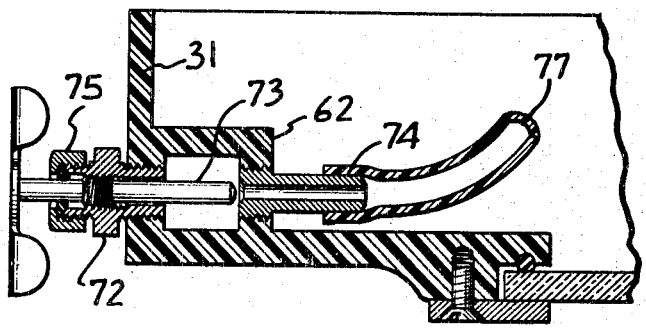
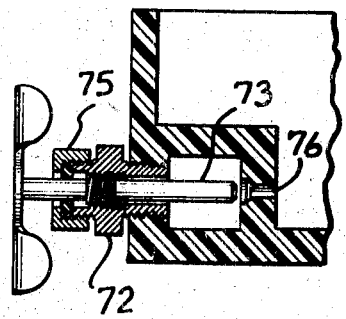
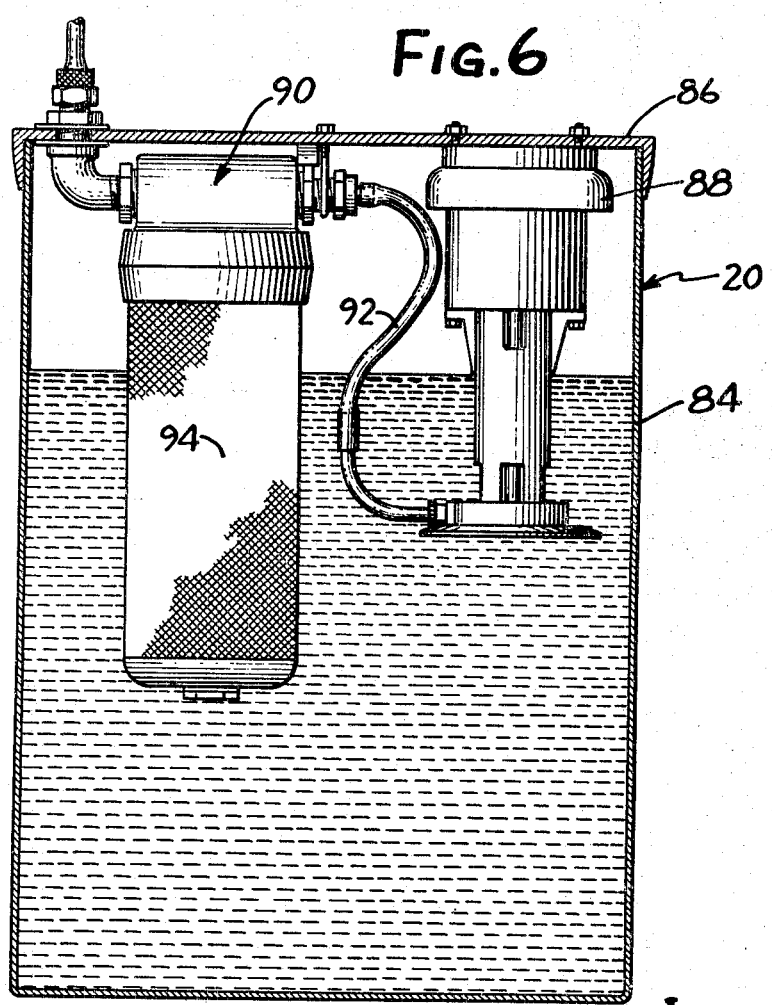
INVENTOR
FLOYD W. NELSON
by: Bair, Freeman & Molinare
ATTYS.

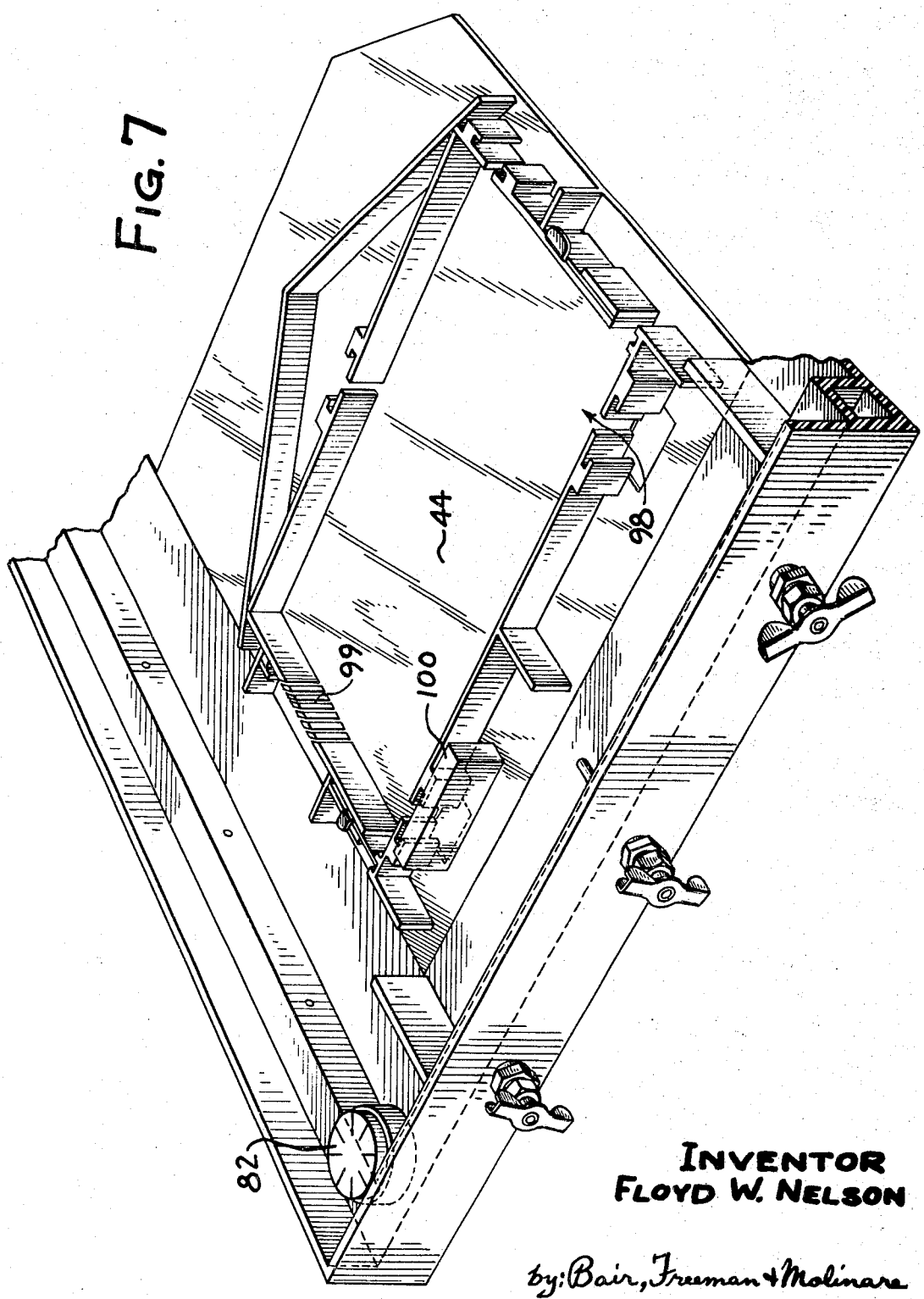

United States Patent Office 3,541,705
Patented Nov. 24, 1970

3,541,705
FLUID TABLE EDUCATIONAL DEVICE
Floyd W. Nelson, 107 S. Riverside,
Ames, Iowa 50010
Filed Nov. 12, 1968, Ser. No. 774,793
Int. Cl. G09b 23/12
U.S. Cl. 35—19
14 Claims

ABSTRACT OF THE DISCLOSURE

A portable water table for use with an overhead projector. The water table includes a frame and modular, interchangeable flow pattern plates. A recirculating sump mechanism provides water through nozzles or orifices in the frame and directs the water over the flow pattern plate mounted within the frame. Colored dyes or powder may be added to the water to more vividly demonstrate the flow pattern. Light from the overhead projector passes through the flow pattern plate and projects the flow pattern onto a screen.

BACKGROUND OF THE INVENTION

This invention relates to an educational device and, in particular, to a portable fluid table utilized advantageously in combination with an overhead projector to visually demonstrate fluid flow.

The overhead slide projector is a valuable aid in the educational profession. Most college class rooms and lecture halls make use of such a device. An instructor may thus use a wax crayon on the screen of the projector and provide notes as he lectures. In this manner, the student receives the advantage of an oral and a visual impression of the lesson.

To further facilitate the learning process slides and various prepared overlay devices can be utilized in conjunction with an overhead projector. These devices help to more vividly illustrate various lessons. The demonstration of motion in an overhead projector is, however, a more sophisticated and difficult problem. For example, demonstrating fluid flow on an overhead projector is a difficult problem.

In the past it has been known that fluid flow could be demonstrated by building a model of a fluid flow restriction or pattern to 'be considered and then mounting that model in a basin of flowing water. Dyes would then be added to the flowing water to demonstrate flow as the water circulated about the restrictions. Such devices are, however, cumbersome, require a great amount of space and much ancillary equipment to be operative. For this reason only a few persons in a laboratory could benefit from a visual demonstration by such devices.

The present invention provides a means whereby a mass of students can visually observe fluid flow demonstrations.

SUMMARY OF THE INVENTION

In a principal aspect the present invention of a teaching aid for demonstrating fluid flow, comprises a fluid flow table especially useful in cooperation with a projector, most often an overhead projector. The table includes a frame with an interior transparent flow pattern plate mounted within the frame. A fluid dispensing orifice or nozzle in the frame causes fluid to flow over the flow pattern plate. The resultant fluid flow may be projected onto a screen. Colored powders or dye may be added to the fluid to accentuate the characteristics of the fluid flow.

It is thus an object of the present invention to provide an improved educational device for visually demonstrating various fluid flow.

It is a further object of the present invention to provide a fluid flow table which is portable and self contained.

One further object of the present invention is to provide a fluid flow table of simple design with a minimum number of parts.

Still another object of the present invention is to provide a fluid flow table in which interchangeable fluid flow patterns may be easily and quickly provided.

One further object of the present invention is to provide a fluid flow table which is adapted for easy combination and use with standard overhead projectors.

Another object of the present invention is to provide a fluid flow table adapted to recirculate fluid through the table, filtering the fluid during recirculation.

These and other objects, advantages and features of the present invention will be set forth in greater detail in the description which follows:

BRIEF DESCRIPTION OF THE DRAWINGS

In the detailed description which follows reference will be made to the drawings comprised of the following figures:

FIG. 2 is a top plan view of the fluid flow table itself;

FIG. 3 is a cross sectional view of the fluid flow table taken substantially along the line 3—3 in FIG. 2;

FIG. 4 is an enlarged cross sectional view of a valve and nozzle utilized in the fluid flow table of the present invention;

FIG. 5 is an enlarged cross sectional view of an alternative valve construction of the fluid flow table;

FIG. 6 is a cross sectional side view of the fluid flow sump mechanism taken substantially along the line 6—6 in FIG. 1; and FIG. 7 is a partial perspective view of a typical fluid flow pattern used to demonstrate fluid flow.

DESCRIPTION OF THE PREFERRED EMBODIMENT

Figure 1:
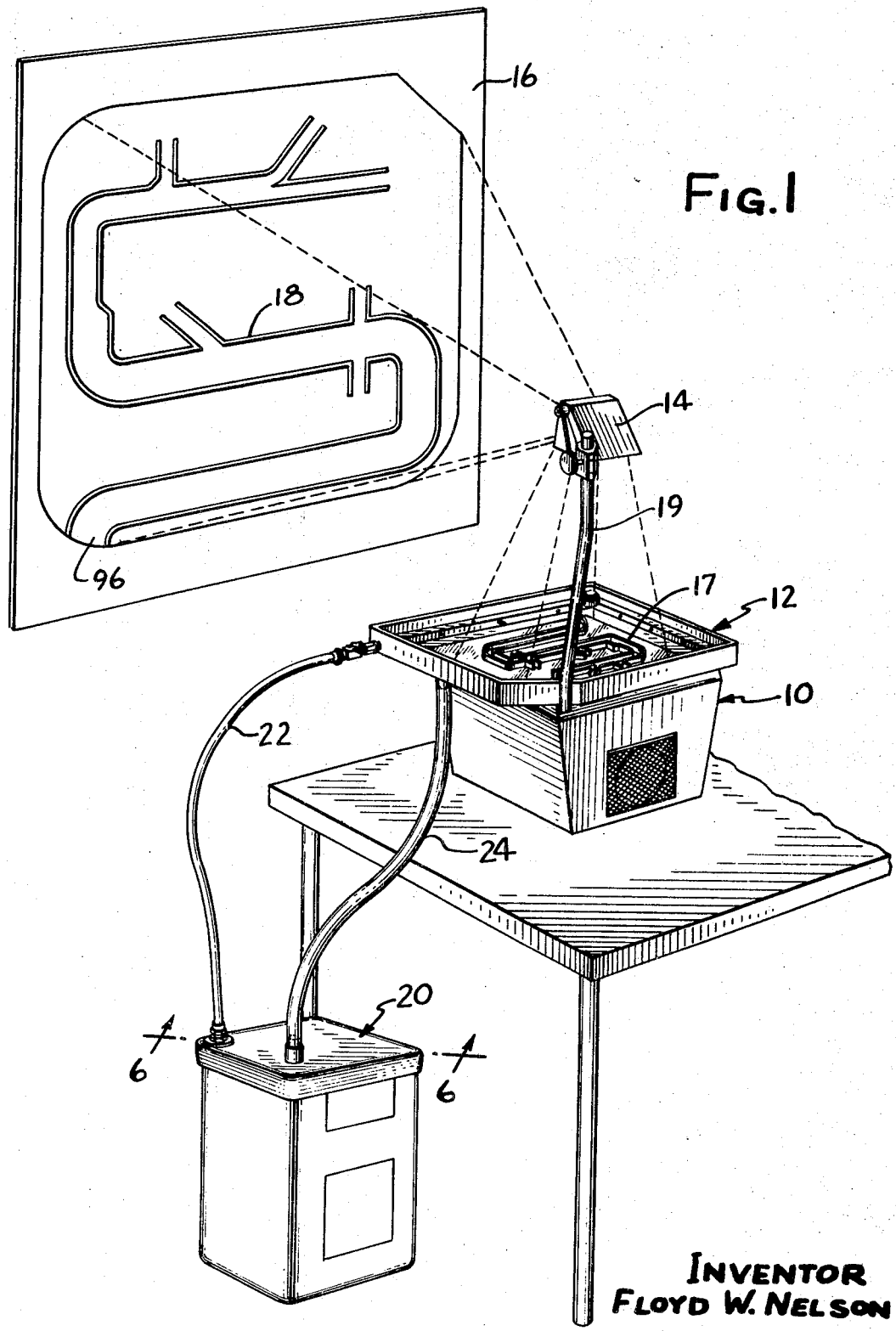
FIG. 1 is a perspective view of the portable fluid flow table of the invention shown in combination with a typical overhead projector.

Referring now to FIG. 1 there is shown a perspective view of a preferred embodiment of the invention assembled in combination with a typical overhead projector. In the following description the invention will make special reference to use of water as a fluid for use with the device. The use of water as the fluid is, however, not a limiting feature of the invention.

In FIG. 1 there is shown an overhead projector 10 having a portable water table 12 positioned thereon. A light source (52 in FIG. 3) within the overhead projector 10 shines light through the transparent base or bottom of the water table 12. The light is directed by means of a projecting lens 14 onto a projection screen 16. A pattern 17 defined on the water table 12 is thus projected onto the screen 16 as an image 18. In FIG. 1 this pattern 17 or image 18 represents duct work for a heating or ventilation system. Fluid flowing about and through the pattern 17 is also projected onto the screen 16.

The water table 12 cooperates with a sump assembly 20 which provides water through a supply conduit 22 for the water table 12. A drain conduit 24 provides a return from the water table 12 to the sump assembly 20. Water for demonstrating fluid flow is thus continuously circulated from the sump assembly 20 through the supply conduit 22 to the table 12 and returned by the drain conduit 24 to the sump assembly 20.

Referring now to FIGS. 2 through 5 and 7 there is shown in greater detail the construction of the water table 12. The table 12 includes a circumferential frame 26. The frame 26, preferably of an extruded aluminum construction, is generally rectangular in shape with one corner being cut off to provide for an arm (19 in FIG. 1) of the projector 10 upon which the projecting lens 14 is mounted. The frame thus includes five consecutively interconnected sides, 31 through 35. Sides 31 and 32 include water manifolds 62 and 64 respectively. side 35 includes a drain trough as at 38 in FIG. 3. Side 34 diagonally connects sides 33 and 35 and includes an inwardly extending wall section 40 adapted to receive the support arm 19 for the projecting lens 14.

The sides 31 through 35 interconnect to define an inner region on the inside of the circumference of the sides 31–35. As illustrated in cross section in FIGS. 3 and 4 the inner edge of each of the sides includes a flange portion 42 extending circumferentially about the inside of the frame 26 to precisely define the inner region of the frame 26. Positioned against the flange portion 42 is a transparent plate 44. A series of spaced support brackets 48 fastened to the frame 46 by means of bolts 50 act to secure the plate 44 in compression against an O-ring 46.

As illustrated in FIG. 3, light from a light source 52 of the overhead projector 10 is directed through the transparent plate 44. A pattern (not shown in FIG. 3) positioned on the plate 44 can thus be projected onto a screen as described before. Plate 44 can be easily replaced by another plate 44 having a different type of flow pattern.

The pattern is fashioned from design members fastened to the plate 44 or merely positioned on the plate 44. Generally a basic pattern is attached to the plate 44 and optional flow restrictions are positioned on the plate as desired during a demonstration. The plate 44 is preferably of Plexiglas and the design members may be of similar materials so long as a visible contrast is maintained for the image 18. This is illustrated in greater detail below in relation to FIG. 7.

As shown in FIG. 2 the supply conduit 22 includes an attachment fitting 54 for connection with a manifold fitting 56. The attachment fitting 54 includes a spring biased lever plate 58 which coacts with a circumferential flange 60 of fitting 56 to couple the fittings 54 and 56. Fluid flow is thus provided to a manifold 62 in side 31 and a second manifold 64 connected with manifold 62 in side 32. Three adjustable valves 66, 67 and 68 are positioned in manifold 62. And three similar adjustable valves 69, 70 and 71 are positioned in manifold 64.

FIGS. 4 and 5 illustrate alternative constructions of these valves. The valves include a rotatable valve stem 73 positioned in a fitting 72 inserted in the outside side wall of side 31 and extending into the manifold 62. A cap 75 holds the stem 73 in fitting 72. A nozzle 74 is provided for the manifold 62 in FIG. 4 whereas a nozzle 74 is omitted from the valve embodiment shown in FIG. 5. The embodiment in FIG. 5 includes only an outlet orifice 76. The nozzle 74 is replaceable and may be of any desired diameter to control the flow rate and velocity of fluid passing from the manifold 62 onto the plate 44. In addition a tube 77 may be attached to nozzle 74 and utilized to direct fluid flow to any desired position on plate 44.

Water provided from the inlet conduit 22 to the manifolds 62 and 64 passes through nozzle fittings 74 or outlet orifices 76 in the manifold walls and flows onto the plate 44. The water then flows through the flow pattern defined on the plate 44 and finally into the trough as at 38 in side 35. Ultimately the water flows through the drain conduit 24 back to the sump assembly 20.

The frame 26 also includes baffle walls 78, 79 and 80 positioned to insure that water flows from the manifolds 62 and 64 will not improperly interact before passing onto the plate 44. A table level device 82 is situated at the junction of sides 31 and 32. The level 82 facilitates proper adjustment of the inclination of the table to provide optimum fluid flow characteristics for the demonstration.

Referring now to FIG. 6 there is shown a cross sectional view of the sump assembly 20. The assembly 20 includes a tank 84 for holding the water. A cover cap 86 is provided for the tank 84. The cap 86 and tank 84 are preferably of polyethylene construction.

Attached to the top of the cap 86 is a centrifugal pump 88 and a filter assembly 90. A standard 110 volt power source with an inline switch provides power for the pump 88 to drive water from the tank 84, through outlet conduit 92 to the filter 90 and out the supply conduit 22. The drain conduit 24 merely drains water from the table 12 into the tank 84.

The filter assembly 90 includes a removable filter cannister 94 to facilitate easy removal cleaning and replacement of the filter 90. Thus, colored powders and dyes may be added to the water as it is being circulated onto the water table 12. The colored dyes or powder are then filtered out by the filter assembly 90 before the water is recirculated.

Referring now to FIGS. 1 and 7, two separate flow patterns are illustrated. As previously mentioned, the flow pattern in FIG. 1 is representative of a duct work arrangement for a ventilating system. By introducing fluid at the entrance end 96 of the duct work 17 and by adding colored dyes a fluid flow pattern in a duct work 17 can be determined and demonstrated. The flow pattern characteristics can be continuously demonstrated by projection of an image 17 on to the screen 16.

As another example, the perspective view in FIG. 7 represents a cross section of a house. Certain valves may be turned on to represent various flow sources. For example, valves 66, 67 or 68 may be operated to represent fluid flow from a furnace source through a register as at 98 into the room of the house. Valves 69, 70 and 71 may be operated to represent fluid flow due to atmospheric winds through vents 99 in the walls of the house. Various blocks such as block 100 may be added and rearranged on the pattern to provide a demonstration of the response of fluid flow sources to various blocked passages. Thus, it can be seen that the versility of the use of the device of the present invention is only limited by the ingenuity of the person using it. Demonstrations of fluid flow arrangements can thus be clearly presented to large groups of students or can be used by a single experimenter wishing to test the results of various projected flow pattern arrangements. Changes in the flow pattern can be provided by moving blocks or the like about on the plate 44. Plates 44 can be easily replaced to provide a new basic flow pattern.

What is claimed is:

1. As a teaching aid in demonstrating fluid flow, a fluid flow table for use with a projector comprising, in combination:
   a table frame having a fluid enclosing circumferential wall surrounding a fluid region, said frame also including at least one fluid dispensing orifice for directing fluid into said region,
   a transparent flow pattern plate within said frame surrounded by said wall, said plate positioned to receive flows of fluid from said orifice, and
   means for providing a fluid flow from said orifice and draining fluid from said plate.

2. The fluid flow table of claim 1 wherein said table frame is a polygonal shaped frame adapted to cooperate with a screen of an overhead projector.

3. The fluid flow table of claim 1 wherein said frame includes a fluid manifold in the wall of said frame, said orifice adapted to receive fluid from said manifold and expell fluid to said region.

4. The fluid flow table of claim 1 including a plurality of orifices positioned in said wall at selected intervals.

5. The fluid flow table of claim 1 wherein said flow pattern plate is detachable from said frame.

6. The fluid flow table of claim 1 including design members positioned on said plate for demonstration of fluid flow characteristics about said design members.

7. The fluid flow table of claim 1 including leveling means for said water table to adjust the inclination of said plate.

8. The fluid flow table of claim 1 including means for indicating the level of said plate.

9. The fluid flow table of claim 1 including a hose connection means from at least one of said orifices for directing fluid from said orifice to a desired position within said region.

10. The fluid flow table of claim 1 wherein said means for providing a fluid flow from said orifice include a fluid sump having a water inlet conduit providing water to said orifice and a fluid return conduit for draining fluid from said table.

11. The fluid flow table of claim 10 wherein said sump includes pump means for circulating said fluid to said fluid flow table.

12. The fluid flow table of claim 10 wherein said sump means includes filter means for filtering said fluid circulated to said fluid flow.

13. The fluid flow table of claim 1 including drain means for draining fluids from said fluid flow table.

14. The fluid flow table of claim 1 including means for coloring fluid dispensed from said orifice to said table.

References Cited

UNITED STATES PATENTS 3,253,353   5/1966   Steed et al. _____ 35—19

OTHER REFERENCES

Stansi: Scientific Division of Fisher Scientific Co. Catalog available August 1968, p. 339 (stream table).

HARLAND S. SKOGQUIST, Primary Examiner

U.S. Cl. X.R.

40—106.21; 353—44